INVENTOR
Pierre Eyzat
BY Spencer & Kaye
ATTORNEYS

June 4, 1968 P. EYZAT 3,386,422
COMPRESSION-IGNITION ENGINE
Filed Nov. 21, 1966 3 Sheets-Sheet 3

INVENTOR
Pierre Eyzat

BY Spencer E Kaye
ATTORNEYS

United States Patent Office 3,386,422
Patented June 4, 1968

3,386,422
COMPRESSION-IGNITION ENGINE
Pierre Eyzat, Vanves, France, assignor to Institut Français du Pétrole, des Carburants et Lubrifiants, Rueil-Malmaison, Hauts-de-Seine, France
Filed Nov. 21, 1966, Ser. No. 595,749
Claims priority, application France, Nov. 23, 1965, 39,509/65
11 Claims. (Cl. 123—32)

ABSTRACT OF THE DISCLOSURE

Disclosed herein is a compression-ignition motor, or engine, which is capable of producing improved ignition for any fuel charge level. The motor includes a principal combustion chamber formed between the cylinder head and the piston and communicating with a pre-chamber through the intermediary of a communicating passage, a fuel injector being disposed with its outlet in the pre-chamber and being arranged for directing a conical sheet of atomized fuel toward the communicating passage, said piston having a projection on its end face, arranged to enter said communicating passage at the end of the compression stroke. Improved operation is obtained by causing the wall of said passage to substantially conform to the outer lateral surface of such conical sheet and the wall of said projection to the inner lateral surface thereof when said piston is in the vicinity of its top dead center position and by causing the volume defined by the space enclosed by the principal combustion chamber to be equal to at least about 70% of the total combustion volume defined by the space enclosed by the principal chamber and the pre-chamber when said piston is in its top dead center position.

---

The present invention relates to compression-ignition engines, or motors, having an improved operation over a wide range of fuel charge levels, the fuel charge level being defined as the quantity of fuel constituting each charge.

The present invention is particularly concerned with a compression-ignition engine, or motor, of the type having at least one cylinder defining a pre-chamber disposed at the upper end of a principal combustion chamber and communicating with the latter by means of a communicating passage, a fuel injector being arranged with its outlet end disposed in the pre-chamber, each cylinder of the engine being provided with a piston whose head, or end face, has a projection arranged to penetrate into the communicating passage when the piston nears the end of its compression stroke.

Among the many previously suggested forms of construction for a compression-ignition engine are those in which the combustion air admitted into the principal combustion chamber is driven toward the pre-chamber during the compression stroke of the piston and forms, while flowing into the annular space between the wall of a projection of a piston and the wall of the communicating passage between the pre-chamber and the principal chamber, air streams into which the fuel is injected. The homogenization of the mixture formed by the air and the injected fuel is obtained by suitably forming the projection and to the pre-chamber so as to cause circulating turbulence paths to be imparted to the air streams admitted into the pre-chamber. At the beginning of the combustion phase, or power stroke, such a motor functions as a motor having a slightly open pre-chamber since this pre-chamber then only communicates by means of a narrow passage with the upper portion of the cylinder, which constitutes the principal combustion chamber. As a result, ignition is propagated from the pre-chamber to the principal combustion chamber by a torch effect which increases the turbulence in the principal chamber and which homogenizes the fuel-air mixture. When a full, or maximum, fuel charge is being delivered, this causes a complete ignition to be produced and permits the motor to be operated with a richer fuel mixture than could be used in direct injection engines, i.e., those not having a pre-chamber, thus resulting in an increased maximum power output.

This type of motor presents, with respect to previous motors having a permanently slightly open pre-chamber, i.e., in which the pre-chamber communicates with the principal combustion chamber by a narrow passage whose cross section remains invariable during the entire operating cycle of the engine, the advantage that it causes the energy losses occurring during the passage of gas from the pre-chamber to the principal combustion chamber to be reduced. This is true because in motors of this type the cross section of the passage offered to the flow of gases increases, due to the withdrawal of the piston projection from the passage, in proportion to the expansion of the combustion gases. However, the remaining loss of energy, although reduced, is far from negligible in improved motors of this type because the minimum combustion volume (constituted by the volume of the principal chamber and the pre-chamber when the piston is in its top center position) is constituted essentially by the volume of the pre-chamber. This is true because, in such motors, at the start of the power stroke almost all of the fuel charge and the combustion air is disposed within the pre-chamber and, as a result, ignition is accompanied by the transfer of a large volume of gas from the pre-chamber to the principal chamber. The thermal losses occurring during the transfer are thus substantial.

Another drawback possessed by previously suggested motors of this type resides in the fact that they do not permit a progressive decrease in the homogenization of the fuel-air mixture as a function of decreases in the size of the fuel charge. It has been experimentally determined that if, for a maximum fuel charge, the maximum richness of the mixture supplied to a compression-ignition engine (beyond which fumes appear in the escape gases as a result of incomplete combustion), i.e., the richness corresponding to maximum power, is obtained with a distribution as homogeneous as possible of the fuel in the combustion air, at very small fuel charge levels, by contrast, optimum specific consumptions (expressed in terms of quantity of fuel consumed per unit of work produced), are obtained when the fuel is distributed in a heterogeneous manner in the combustion air.

It is a primary object of the present invention to substantially eliminate the drawbacks associated with prior art engines of this type.

A further object of the present invention is to provide an improved operating efficiency for all fuel charge levels.

A further object of the present invention is to vary the homogeneity of the distribution of fuel in combustion air as a function of the quantity of fuel constituting each fuel charge.

Yet another object of the present invention is to provide a compression-ignition engine having a pre-chamber whose volume never exceeds 30% of the total combustion space volume.

These and other objects according to the present invention are achieved by the provision of a compression-ignition engine of the type comprising means defining at least one cylinder having a principal combustion chamber, a pre-chamber and, a communicating passage between the two chambers, a piston disposed in each cylinder, connected in driving relationship with a crankshaft, and having a projection disposed on its end face, and a fuel injector having its outlet end disposed in the prechamber, the projection being arranged to enter the communicating passage substantially at the end of the compression stroke of the piston, when the piston rises towards its top center position. Specifically, the present invention provides the improvement that the injector is arranged to deliver, substantially at the end of each compression stroke of the piston, a charge of fuel in the form of a conical sheet of spray directed toward the passage, the wall of the passage is arranged to conform substantially to the outer lateral surface of the conical sheet, and the wall of the projection is arranged to conform substantially to the inner lateral surface of such conical sheet when the piston is in the vicinity of its top center position. Furthermore, the projection is made of sufficient height to begin penetrating the region defined by the passage when the piston is in a position corresponding to an angular crankshaft position between 15° and 35° ahead of the top center position of the piston, and the end face of the piston is provided with an annular recess surrounding the projection, the inner edge of the recess merging tangentially with the wall of the projection, and the recess being dimensioned to render the volume of the space defined by the principal combustion chamber equal to at least 70% of the total volume of the space defined by the principal chamber and the pre-chamber when the piston is in its top center position. According to the present invention, and when the maximum fuel charge is being injected, the injection will not begin much before the start of penetration of the projection into the region defined by the communicating passage, and, in practice, the maximum advance of the start of injection, under full charge conditions, relative to the start of penetration of the projection into the space defined by the communicating passage will not exceed a piston displacement corresponding to an angular rotation of 10° of the crankshaft. Fuel injection preferably terminates before the piston reaches its top center position and, at the latest, at the point of piston displacement corresponding to a 5° rotation of the crankshaft beyond the position corresponding to the top center position of the piston.

Additional objects and advantages of the present invention will become apparent upon consideration of the following description when taken in conjunction with the accompanying drawings in which.

Figure 1:
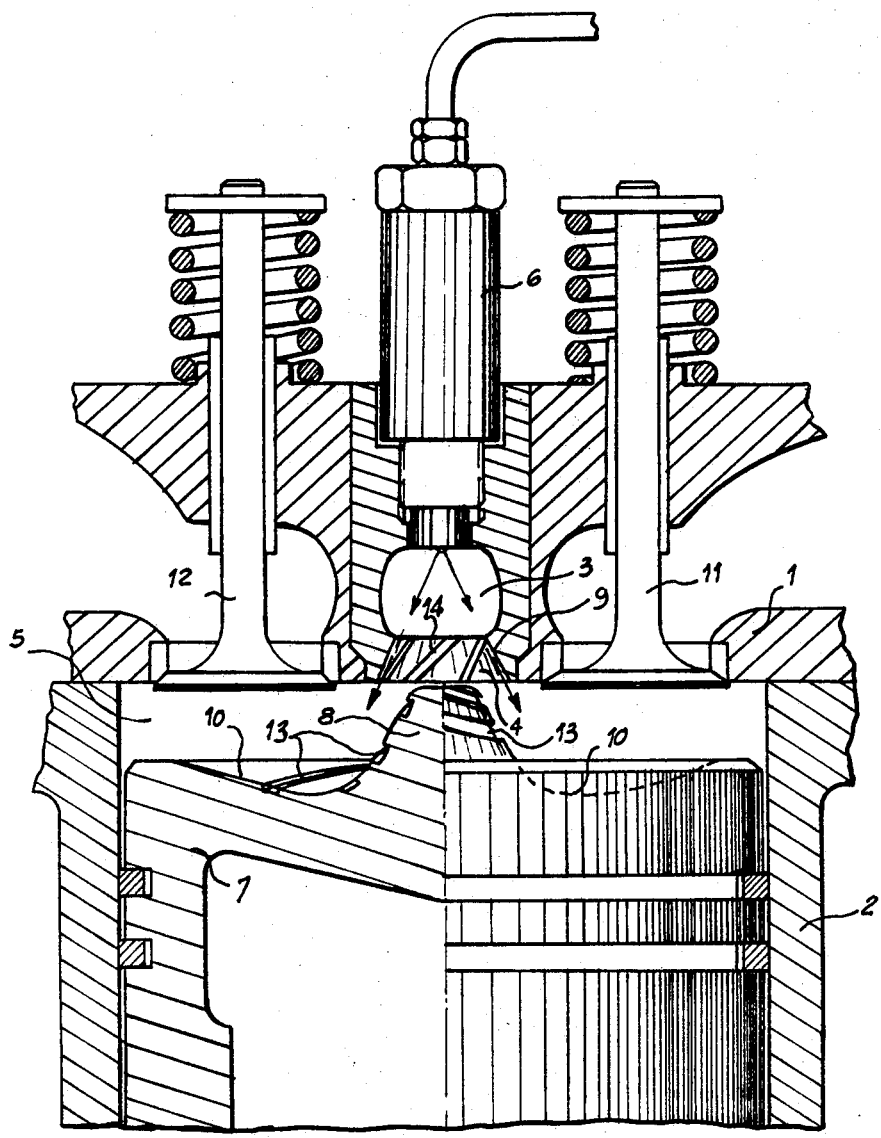
FIGURE 1 is an elevational, cross-sectional view of a first embodiment of the present invention.

Referring first to FIGURE 1, there is shown one cylinder arrangement of an internal combustion engine according to the present invention which includes a cylinder 2 and a cylinder head 1 having a pre-chamber 3 formed therein. Pre-chamber 3 has the form of a volume of revolution about the longitudinal axis of cylinder 2. Pre-chamber 3 communicates by means of an axial communicating passage 4 with the upper end of the cylinder, which end constitutes the principal combustion chamber 5. An injector 6 has its outlet end extending into pre-chamber 3 and has its axis aligned with the axes of the pre-chamber 3, the passage 4, and the cylinder 2.

Disposed within cylinder 2 is a position 7 whose head is provided with a boss, or projection 8, which is also symmetrically disposed with respect to the axis of cylinder 2 and which extends upwardly in order to be able to enter passage 4 when piston 1 comes to the top of its stroke.

The arrangement is further provided with an intake valve 11 for the introduction of combustion air and an exhaust valve 12 for the escape of exhaust gases. These valves are operated in synchronism with the movement of piston 7 in a manner, and by a mechanism, well known per se.

The injector 6 is of a type capable of producing an atomized fuel spray jet having the form of a conical sheet, or a hollow cone, and directed toward the annular space formed between the wall of projection 8 and the wall of passage 4 when cylinder 7 reaches the end of its compression travel. Injector 6 may be constituted, for example, by an injector having a cone nozzle, a suitable injector of this type being described in Injection and Controls for Internal Combustion Engines, Chaper 9, p. 12, FIGURE 146 (Simon Boardman Publishing Corporation).

In the illustrated embodiment, the wall of projection 8 and the wall 9 of passage 4 both approximate the form of the frustum of a right circular cone having substantially the same apical angle as the conical jet produced by injector 6, this angle being of the order of 60° in the present embodiment.

More generally stated, in a motor according to the present invention, the wall of projection 8 and the wall 9 of passage 4 will have complementary forms which conform with the configuration of the fuel spray, i.e., the wall of projection 8 will be substantially parallel to the inner surface sheet of fuel emitted by the nozzle of injector 6 and wall 9 will be substantially parallel to the outer surface of that sheet. These walls will preferably approximate the form of right circular conic frustums having apical angles of between 20° and 140°, with the apical angles of the two frustums not differing from one another by more than 20°.

If the apical angles of these frustums and of the jet emitted by injector 6 were less than 20°, the fuel stream passing from the pre-chamber 3 into the principal combustion chamber 5 via the annular space between projection 8 and wall 9 when the piston is near its top center position, or upper dead center point, would strike the head, or end face of piston 7 at too small an inclination with respect to the axis of the piston. As a result, the fuel sheet would be abruptly halted by the surface connecting the projection 8 to the piston head and would thus be prevented from reaching the peripheral portions of the principal combustion chamber 5. This is avoided by making these apical angles no less than 20°.

In the embodiment of FIGURE 1, the cross-sectional area of the channel presented to the flow of fluid from the pre-chamber 3 to the principal combustion chamber 5, which channel is defined by the annular space between projection 8 and wall 9, increases progressively in a continuous manner when the piston 7 begins to move away from its top center position. At the top center position of the piston 7, the cross-sectional area of such flow channel is a minimum and is arranged to not exceed 1% of the cylinder bore corss-sectional area. This channel area may for example attain a value of the order of 5% of this bore area, when the projection 8 has been entirely withdrawn from the region defined by passage 4.

In order to cause the presence of the pre-chamber 3 to have a marked action concerning the increase of turbulence in the main chamber by a torch effect when the piston 7 is in the vicinity of its top center position, the cross-sectional area of this channel formed between projection 8 and wall 9 should remain below 5% of the cylinder bore cross-sectional area until the piston 7 has moved to a position corresponding to an angular interval of its associated crank shaft of 20° with respect to its top dead center position. In any event, the maximum cross-sectional area of this channel should not exceed 10% of the cross-sectional area of the cylinder bore and should not exceed 8% of the cross-sectional area of the cylinder bore when the peak of the projection 8 is flush with the lower extremity of passage 4.

The small cross-sectional area offered to the flow of fuel spray between pre-chamber 3 and the principal combustion chamber 5 when piston 7 is in the vicinity of its top center position permits the attainment of a sufficient pressure drop to impart a good turbulence to the combustion air driven into the pre-chamber at the end of the compression stroke and to the gases entering the principal combustion chamber at the start of ignition, i.e., the pre-chamber is only slightly open when the piston 7 is at its top center position. The lower limit for this cross-sectional area of the channel will be determined by technological considerations, e.g., the requirement that an adequate play exist between the projection 8 and the wall 9 to permit the motor to operate satisfactorily. However, in choosing the lower limit for this cross-sectional area, it is also necessary to take into account the fact that if the cross-sectional area is too small the pressure drops will become undesirably high.

The wall of projection 8 is advantageously provided with a groove 13, or with a plurality of such grooves, which might be continued onto the upper end face of piston 7. This groove, or grooves, is provided primarily for increasing the turbulence imparted to the combustion air driven into the pre-chamber at the end of the compression stroke and of the combustion gases leaving the pre-chamber at the start of combustion. This groove will preferably be formed to have a tangential component having the same sense as the tangential component of the movement imparted to the entering air by the inlet port associated with valve 11 so as to reinforce, or at least not diminish the circulatory movement about the cylinder axis which is normally given to the combustion air as it is admitted by valve 11. In order to impart such a movement to the air admitted past valve 11, the inlet port associated with this valve is generally given an appropriate configuration. This circulatory movement is conserved by the gases during the power stroke of the piston and thus permits a still greater improvement in the homogeneity of the combustion mixture when a maximum fuel charge is being supplied. The helical groove 13 may cooperate with grooves 14 formed in the wall 9 of passage 4.

Since the injection of fuel occurs when piston 7 is in the vicinity of its top center position, the motor functions as a motor having a pre-chamber provided with a small opening at the start of the ignition, or combustion phase and the combustion gases, which pass from the pre-chamber to the principal combustion chamber via the annular space between projection 8 and wall 9 (as indicated by the arrows) create a strong turbulence within the principal combustion chamber 5. This turbulence is enhanced by the form given to the head, or end face, of piston 7 by the provision of an annular recess 10 surrounding the projection 8 and joined tangentially thereto so as to provide a smooth transition between the wall of projection 8 and the recess 10. Recess 10 is formed and dimensioned so as to cause the space defined by the principal combustion chamber 5 to have a volume which represents at least 70% of the total minimum volume of the space defined by chambers 3 and 5 when the piston is in its top center position.

When the piston begins to move downwardly, the cross-sectional area offered to the passage of gas between the pre-chamber 3 and the principal combustion chamber 5 increases progressively toward a maximum value approaching the total cross-sectional area of the passage 4. Since this increase reduces the pressure drops experienced by the flowing gases, it also diminishes the thermal losses thereof.

When the piston 7 descends to a point at which the projection 8 is substantially completely removed from the region defined by passage 4, the motor functions as a direct injection motor, the pre-chamber 3 being substantially open.

In contrast with previously suggested motors of the type in which the space defined by the pre-chamber constitutes substantially the entire volume of the pre-chamber-principal chamber space when the piston is in its top center position, a motor according to the present invention has the advantage that it permits a substantial reduction in the thermal losses occurring during the transfer of the fuel mixture from the pre-chamber 3 to the principal combustion chamber 5. This reduction is due to the fact that in the motor of the present invention the volume of the space defined by the pre-chamber 3 does not exceed 30% of the total minimum combustion volume, when the piston 7 is in its top center position, and as a result only a small percentage of the combustion gas must be transferred from the pre-chamber to the principal combustion chamber at the start of the power stroke, or combustion phase.

Moreover, this advantage possessed by motors according to the present invention is not accompanied, under maximum fuel conditions, by a proper homogenization of the air-fuel mixture, and hence a poorer power-to-weight ratio, than prior art motors of the type in which the pre-chamber defines practically the entire volume of the combustion space when the piston is in its top center position, i.e., in which all of the gaseous mixture is mixed in the pre-chamber by air streams driven into the latter at the end of the compression stroke and where the ignition originating in the pre-chamber and further improving the homogeneity of this gaseous mixture at the start of combustion is carried out on a larger proportion of the combustion gas.

Figure 2A:
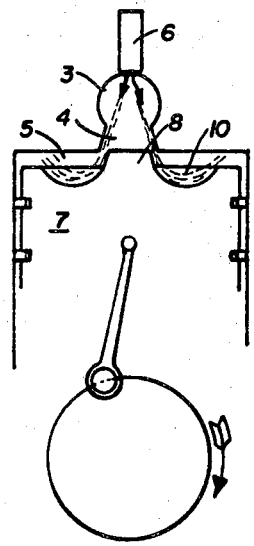
FIGURE 2a is a simplified pictorial view of the arrangement of FIGURE 1 at the end of the compression stroke for the case where a full charge of fuel is being delivered.
Figure 2B:
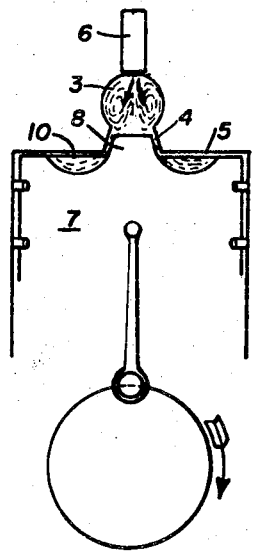
FIGURE 2b is a view similar to that of FIGURE 2a at the end of the fuel intake cycle.

FIGURES 2a and 2b illustrate pictorially the angular position of the crankshaft and the relative position of the piston 7 at the start and finish, respectively, of the fuel injection cycle for the injection of a maximum fuel charge. As is shown in FIGURE 2a, injection begins under these conditions shortly before, or simultaneously with, the entry of projection 8 into the region defined by passage 4. The injected fuel spray is distributed throughout combustion chamber 5, particularly at the start of the injection operation, due to the fact that, according to the present invention, the walls of projection 8 and passage 4 conform to the configuration of the conical stream produced by injector 6. The passage of the fuel spray into chamber 5 is also aided by the configuration of the annular recess 10 formed in the head, or end face, of piston 7. Since the inner edge of this annular recess is tangential with the adjacent portion of the wall of projection 8, it is also substantially tangential to the direction of flow of the fuel stream. The smooth curvature of the annular recess 10 aids the flow of the fuel outwardly as far as the periphery of combustion chamber 5, the spray jet not being halted or substantially decelerated by any impact against the walls of the projection 8 or the end face of piston 7. Then, when the piston reaches the vicinity of its top center position, as is shown in FIGURE 2b, projection 8 blocks a large portion of the passage 4 and thus causes the fuel which is last injected to remain, and to be distributed, in pre-chamber 3.

Thus, under these conditions of maximum fuel charge, the fuel is distributed in the principal combustion chamber at the start of the fuel injection operation when the passage 4 is substantially open (FIGURE 2a), and then in the pre-chamber 3 at the end of the fuel injection cycle when the passage 4 is almost completely closed by projection 8 (FIGURE 2b). As a result, under maximum fuel charge conditions, the motor according to the present invention produces an extremely homogeneous distribution of the fuel in the combustion air filling the entire combustion space constituted by chambers 3 and 5, such a distribution having the desirable effect of permitting a high power-to-weight ratio to be obtained.

In order to vary progressively and continuously the homogeneity of the distribution of fuel in the combustion air as a function of the quantity of fuel constituting the fuel charge, it has been found desirable in a motor according to the invention to have an end of the injection period which remains invariable or varies only slightly when the charge varies, the time of starting this injection being retarded in proportion to the decrease of the fuel charge from its maximum value.

Injection devices adapted to realize such injection conditions are well known in the art and are for example disclosed in Diesel Engineering Handbook by Karl W. Stimson. 11th edition p. 73, FIGURES 8–10 (Diesel Publication Inc.). In other words, motors according to the present invention are arranged so that the smaller the total quantity of fuel injected for each combustion cycle, the greater the penetration of projection 8 into passage 4 at the start of the fuel injection operation. As a result, the average cross-sectional area offered to the passage of the injected fuel spray decreases as the fuel charge diminishes.

Figure 2C:
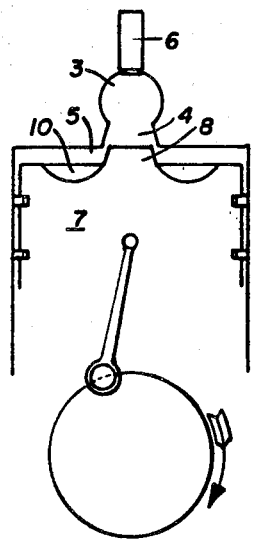
FIGURE 2c is a view similar to that of FIGURE 2a showing the same relative point in the cycle as FIGURE 2a, but for the intake of a relatively small fuel charge.
Figure 2D:
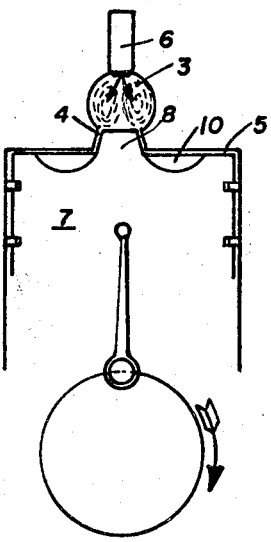
FIGURE 2d is a view similar to that of FIGURE 2b at the end of the intake cycle for the intake of such small fuel charge.

FIGURES 2c and 2d are simplified pictorial views showing the same relative positions for the piston and crankshaft as FIGURES 2a and 2b, respectively, corresponding to the injection of a very small fuel charge. Under these conditions, injection does not begin until the projection 8 has penetrated almost entirely into passage 4, this being some time after the crankshaft and piston have reached the position shown in FIGURE 2c. As a result, the passage left open around projection 8 has a very small cross-sectional area during the entire injection operation and, as a result, substantially all of the fuel charge remains in the pre-chamber 3. Therefore, a great inequality exists between the fuel densities in the space defined by the pre-chamber 3 and in the space defined by the principal combustion chamber 5.

Similarly, a continuous increase, from one combustion cycle to the next, in the size of the fuel charge, which is produced by a corresponding advance in the start of the fuel injection operation, is associated with a progressive increase in the average cross-sectional area of the channel offered to the flow of the fuel stream between pre-chamber 3 and combustion chamber 5. It thus results that such motors provide a progressive increase in the homogeneity of the distribution of fuel in the combustion air as the fuel charge increases. This permits motors according to the present invention to achieve optimum combustion efficiencies for each fuel charge level.

Such a continuous variation of the homogeneity of the mixture as a function of the quantity of fuel injected can be achieved for all, or the major part, of the range of charge levels to be used by causing the end of each injection operation to be substantially independent of the charge level and by varying the start of each injection operation from a starting value, associated with a maximum fuel charge, corresponding to a crankshaft angular position of no greater than 10° ahead of the position corresponding to the start of penetration of projection 8 into passage 4. As previously indicated, the injection operation should terminate, at the latest, at the instant corresponding to a crankshaft angular position of 5° past the top center position of piston 7, it actually being preferable that the injection operation end before the piston reaches its top center position.

The passage 4 and the projection 8 are preferably centered on the longitudinal axis of cylinder 2, and the pre-chamber 3 is preferably constituted by a volume of revolution about the same axis, as is illustrated in the embodiment of FIGURE 1, in all cases in which the cylinder bore is sufficiently large to permit such an arrangement, taking into account the positions occupied by the valve seats in the cylinder head 1. The following advantages are realized when the projection 8 and the pre-chamber 3 are centered substantially on the axis of cylinder 2:

(1) The thermal loading on the piston is distributed in a regular manner about the piston circumference, thus causing any dilation of the periphery of the piston to be regularly distributed around its circumference and causing the hottest regions of the piston to be spaced a maximum distance from the piston rings;

(2) The gases can be subjected to a satisfactory turbulence level, even in the regions of the principal combustion chamber furthest removed from the passage 4, with an initial energy of the gases leaving the pre-chamber lower than if the pre-chamber were eccentrically disposed with respect to the cylinder axis and communicated with the principal combustion chamber by means of a passage having the same diameter as axial passage 4.

It thus results that an axial disposition of the pre-chamber permits an improved mixing of the air and fuel in the principal combustion chamber zones furthest removed from the pre-chamber outlet when a maximum fuel charge is being injected. All other conditions being equal, this results in a reduction in the percentage of unburned fuel when very rich fuel-air ratios are provided and in an improved utilization of the combustion air admitted to the combustion chamber.

It is also possible to contruct a motor according to the present invention in which the projection from the end face of the piston is disposed eccentrically and/or is inclined with respect to the cylinder axis. Such a form of construction is illustrated in a simplified manner in FIGURE 3.

Figure 3:
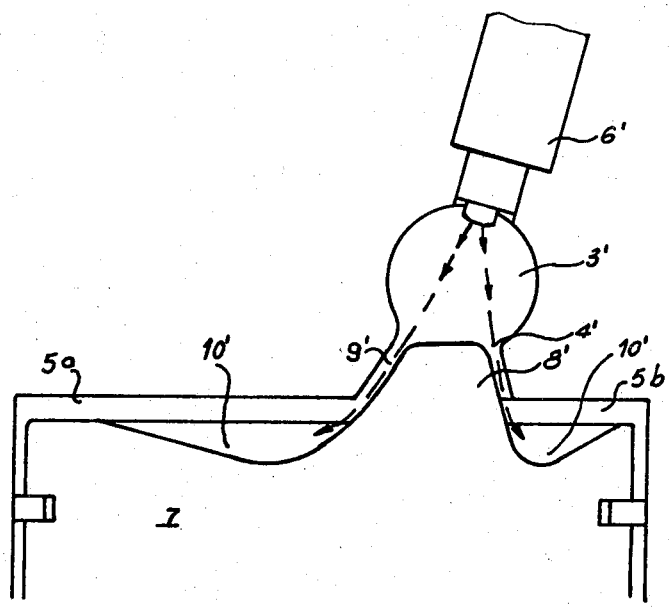
FIGURE 3 is a simplified elevational, cross-sectional view showing a second embodiment of the present invention.

The arrangement shown in FIGURE 3 includes a pre-chamber 3′, a projection 8′ extending from piston 7, and an injector 6′, all disposed eccentrically and inclined with respect to the cylinder axis. However, the structure shown in this figure retains all of the essential characteristics of the present invention in that it provides for the injection of a fuel stream having a substantially conical configuration conforming to the shape of the wall 9′ of passage 4′ and of the wall of projection 8′ and in that an annular recess 10′, which is here eccentric with respect to the cylinder axis, is formed in the end face of piston 7. Such a form of construction could be employed, for example, for engines having small bores of the type in which the positions of the valves on the cylinder head would render it impossible to center the projection 8′ on the cylinder axis.

In order to assure that, when a maximum fuel charge is injected and when the piston 7 is in its top center position, the eccentric disposition of projection 8′ and injector 6′ in the embodiment of FIGURE 3 will not lead to a reduced uniformity in the distribution of the fuel in the combustion volume defined by the principal combustion chamber, it has been found to be advantageous to employ an injector which is constructed so as to deliver a greater amount of fuel into the zone 5a of the principal chamber than into the zone 5b, zone 5a defining a larger volume than zone 5b. The two zones can be considered to be divided by a plane passing through the axis of injector 6′ and perpendicular to a plane containing the axis of the cylinder and passing through the peak of projection 8′.

Figure 3A:
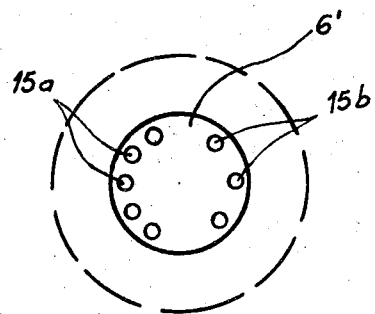
FIGURE 3a is a detail plan view, to an enlarged scale, of one element of the embodiment of FIGURE 3.

FIGURE 3a is an end view showing one type of nozzle arrangement which the injector 6′ might be given for providing the above-described type of fuel distribution. In this injector, the output orifices 15a, which are arranged for introducing fuel into the combustion chamber zone 5a, have a larger total cross-sectional area than the orifices 15b arranged for supplying fuel to the principal combustion chamber zone 5b. The ratio of fuel delivered by the two sets of orifices is chosen to be substantially equal to the ratio of the volumes occupied by the two principal combustion chamber zones.

It will be understood that the above description of the present invention is susceptible to various modifications, changes, and adaptations, and the same are intended to be comprehended within the meaning and range of equivalents of the appended claims.

What is claimed is:

1. In a compression-ignition engine of the type comprising means defining at least one cylinder having a principal combustion chamber, a pre-chamber, and a communicating passage between the two chambers, a piston disposed in each cylinder, connected in driving relationship with a crankshaft, and having a projection disposed on its end face, and a fuel injector having its outlet end disposed in said pre-chamber wherein said projection is arranged to enter said communicating passage substantially at the end of the compression stroke of said piston, said piston being in its top center position at the end of the compression stroke, the improvement wherein:

(a) said injector is arranged to deliver, substantially at the end if each compression stroke of said piston, a charge of fuel in the form of a conical sheet of spray directed toward said passage;

(b) the wall of said passage conforms substantially to the outer lateral surface of such conical sheet;

(c) the wall of said projection conforms substantially to the inner lateral surface of such conical sheet when said piston is in the vicinity of its top center position;

(d) said projection is of sufficient height to begin penetrating the region defined by said passage when said piston is in a position corresponding to an angular crankshaft position of between 15° and 35° ahead of the top center position of said piston; and (e) the end face of said piston is provided with an annular recess surrounding said projection, the inner edge of said recess merging tangentially with the wall of said projection, and said recess being dimensioned to render the volume of the space defined by said principal combustion chamber equal to at least 70% of the total volume of the space defined by said principal chamber and said pre-chamber when said piston is in its top center position.

2. An arrangement as defined in claim 1, wherein, for delivery of a maximum fuel charge by said injector, said injector is arranged to commence fuel injection when said piston is in a position corresponding to an angular crankshaft position of no greater than 10° ahead of its angular position corresponding to the start of penetration of said projection into the region defined by said passage during the compression stroke of said piston.

3. An arrangement as defined in claim 1, wherein the walls of said passage and said projection have the form of conic frustums whose apical angles are substantially equal to the apical angle of the conical sheet of fuel spray, the apical angles of said frustums having a value of between 20° and 140° and differing from one another by no more than 20°.

4. An arrangement as defined in claim 1, wherein the wall of said projection is provided with at least one helical groove.

5. An arrangement as defined in claim 1, wherein the cross-sectional area of the flow path defined between said projection and the wall of said passage remains less than 5% of the bore area of said cylinder as long as the displacement of said piston with respect to its top center position remains less than that which corresponds to an angular displacement of the associated crankshaft of ±20° with respect to its orientation at the top center position of said piston.

6. An arrangement as defined in claim 1, wherein there is provided at least one helical groove disposed in the wall of said projection and extending onto the end face of said piston.

7. An arrangement as defined in claim 1, wherein the wall of said passage is provided with at least one groove.

8. An arrangement as defined in claim 1, wherein said injector, said projection, and said passage are centered on the axis of said cylinder.

9. An arrangement as defined in claim 1, wherein said projection is disposed eccentrically with respect to the axis of said cylinder.

10. An arrangement as defined in claim 9, wherein said injector is arranged to deliver most of the fuel charge into that zone of the principal combustion chamber which is disposed at that side of a given plane at which the cylinder axis is disposed, which given plane contains the injector axis and is perpendicular to a plane containing the cylinder axis and passing through the peak of that projection.

11. An arrangement as defined in claim 1, wherein said projection is disposed inclined with respect to the axis of said cylinder.

References Cited

UNITED STATES PATENTS

| | | | |
|---|---|---|---|
| 1,419,702 | 6/1922 | Tartrais | 123—32 |
| 1,605,000 | 11/1926 | Schneider | 123—32 |
| 1,867,682 | 7/1932 | Sperry | 123—32 |
| 1,867,683 | 7/1932 | Sperry | 123—32 |
| 2,033,810 | 3/1936 | Bernard | 123—32 |

LAURENCE M. GOODRIDGE, *Primary Examiner.*